(12) United States Patent
Khan

(10) Patent No.: US 8,773,869 B2
(45) Date of Patent: Jul. 8, 2014

(54) SYSTEM AND METHOD FOR CONVERSION OF HIGH VOLTAGE AC TO LOW VOLTAGE DC USING INPUT VOLTAGE GATING

(75) Inventor: Zafarullah Khan, Kenner, LA (US)

(73) Assignee: Itron, Inc., Liberty Lake, WA (US)

( * ) Notice: Subject to any disclaimer, the term of this patent is extended or adjusted under 35 U.S.C. 154(b) by 292 days.

(21) Appl. No.: 13/074,890

(22) Filed: Mar. 29, 2011

(65) Prior Publication Data
US 2011/0235368 A1    Sep. 29, 2011

Related U.S. Application Data

(60) Provisional application No. 61/318,600, filed on Mar. 29, 2010.

(51) Int. Cl.
H02M 3/335 (2006.01)
H02M 3/338 (2006.01)

(52) U.S. Cl.
USPC ....... 363/16; 363/21.02; 363/21.06; 363/21.1

(58) Field of Classification Search
USPC .............. 363/16–18, 20, 21.01, 21.04, 21.07, 363/21.09, 21.1, 21.11, 21.12, 21.14, 21.15, 363/21.17, 21.18, 125–127; 323/259, 323/266–282, 284–286
See application file for complete search history.

(56) References Cited

U.S. PATENT DOCUMENTS

| | | | |
|---|---|---|---|
| 3,649,906 A * | 3/1972 | Carpentier et al. | 323/268 |
| 3,947,747 A | 3/1976 | Smith | |
| 4,074,345 A | 2/1978 | Ackermann | |
| 4,922,404 A | 5/1990 | Luwig et al. | |
| 4,975,823 A * | 12/1990 | Rilly et al. | 363/21.16 |
| 5,179,512 A | 1/1993 | Fisher et al. | |
| 5,430,637 A | 7/1995 | Buck | |
| 5,457,462 A * | 10/1995 | Mitsumoto et al. | 342/93 |
| 5,485,077 A * | 1/1996 | Werrbach | 323/286 |
| 5,764,496 A | 6/1998 | Sato et al. | |
| 6,069,391 A * | 5/2000 | Yuzuriha | 257/374 |
| 6,069,804 A * | 5/2000 | Ingman et al. | 363/21.14 |
| 6,169,391 B1 | 1/2001 | Lei | |
| 6,275,018 B1 | 8/2001 | Telefus et al. | |

(Continued)

OTHER PUBLICATIONS

United States Patent and Trademark Office, "Non-Final Office Action," issued in connection with U.S. Appl. No. 12/270,985, Feb. 16, 2011, 57 pages.
United States Patent and Trademark Office, "Final Office Action," issued in connection with U.S. Appl. No. 12/270,985, Nov. 1, 2011, 31 pages.

(Continued)

Primary Examiner — Adolf Berhane
Assistant Examiner — Nusrat Quddus
(74) Attorney, Agent, or Firm — Hanley, Flight & Zimmerman, LLC

(57) ABSTRACT

A method and apparatus for conversion of high voltage AC to low voltage high current DC without using high voltage capacitors or transformers. A single switch is used to perform both the functions of pre-regulation and switching conversion. An input voltage detector determines when the input power AC is below a predetermined voltage limit. A threshold voltage generator provides a threshold voltage corresponding to the output voltage. A voltage comparator coupled to the input voltage detector and threshold voltage generator enables a pulse generator to activate the switch to gate a number of pulses of the input power below the predetermined voltage limit at predetermined frequency to a transformer. The converter regulates its output voltage by changing the input voltage threshold at which it starts switching, instead of using PWM or other known regulation technique.

20 Claims, 12 Drawing Sheets

(56) References Cited

U.S. PATENT DOCUMENTS

| | | | |
|---|---|---|---|
| 6,469,920 B2 | 10/2002 | Butler et al. | |
| 6,597,159 B2* | 7/2003 | Yang | 323/283 |
| 6,788,039 B2 | 9/2004 | Abdoulin | |
| 7,002,815 B2* | 2/2006 | Scarlatescu | 363/34 |
| 7,123,491 B1 | 10/2006 | Kusumi | |
| 7,183,670 B2 | 2/2007 | To | |
| 7,199,560 B2 | 4/2007 | Cheung et al. | |
| 7,215,105 B2 | 5/2007 | Balakrishnan et al. | |
| 7,330,364 B2* | 2/2008 | Lynch | 363/84 |
| 7,489,120 B2* | 2/2009 | Matthews | 323/284 |
| 7,598,703 B2 | 10/2009 | Zhang et al. | |
| 7,859,864 B2* | 12/2010 | Shiroyama | 363/21.12 |
| 8,049,470 B2* | 11/2011 | Khan | 320/167 |
| 2005/0057951 A1 | 3/2005 | Berghegger | |
| 2005/0088858 A1 | 4/2005 | Kogel et al. | |
| 2005/0146308 A1* | 7/2005 | Quazi et al. | 322/28 |
| 2006/0097705 A1 | 5/2006 | Cheung | |
| 2006/0208969 A1 | 9/2006 | Berghegger | |
| 2006/0215423 A1 | 9/2006 | Schonleitner et al. | |
| 2006/0220623 A1 | 10/2006 | Andruzzi et al. | |
| 2006/0255776 A1 | 11/2006 | Fishbein et al. | |
| 2007/0182338 A1* | 8/2007 | Shteynberg et al. | 315/200 R |
| 2007/0223255 A1* | 9/2007 | Condemine et al. | 363/16 |
| 2009/0129133 A1* | 5/2009 | Khan | 363/126 |
| 2009/0207602 A1 | 8/2009 | Reed et al. | |
| 2011/0248685 A1* | 10/2011 | Khan | 320/167 |

OTHER PUBLICATIONS

United States Patent and Trademark Office, "Non-Final Office Action," issued in connection with U.S. Appl. No. 12/270,985, Mar. 29, 2012, 28 pages.

United States Patent and Trademark Office, "Non-Final Office Action," issued in connection with U.S. Appl. No. 12/270,985, Sep. 10, 2012, 38 pages.

United States Patent and Trademark Office, "Notice of Allowance," issued in connection with U.S. Appl. No. 12/270,985, Jan. 24, 2013, 29 pages.

United States Patent and Trademark Office, "Non-Final Office Action," issued in connection with U.S. Appl. No. 13/730,002, Aug. 23, 2013, 39 pages.

United States Patent and Trademark Office, "Notice of Allowance," issued in connection with U.S. Appl. No. 13/730,002, Feb. 3, 2014, 32 pages.

"Adjustable Off-Line Inductorless Switching Regulator," 8 pages, SR086, www.supertex.com, Sunnyvale, CA.

"Preliminary Specification," 3 pages, Central Technologies, Irvine, CA.

Simpson, "Linear and Switching Voltage Regulator Fundamentals," 62 pages, www.national.com/assets/en/appnotes/f4.pdf and www.national.com/assets/en/appnotes/f5.pdf, National Semiconductor.

"Standard Power Pack P25," May 2009, 26 pages, Biometra.

"Liebert NPower 3-Phase UPS: 30-130kVA, 60 Hz, 600VAC," 2 pages, www.liebert.com, Liebert Corporation, Nov. 2004.

* cited by examiner

FIG. 10 (Alternate Embodiment)

SYSTEM AND METHOD FOR CONVERSION OF HIGH VOLTAGE AC TO LOW VOLTAGE DC USING INPUT VOLTAGE GATING

CROSS REFERENCE TO RELATED APPLICATION

This application claims the benefit under 35 U.S.C. §119 (e) of U.S. Provisional Pat. App No. 61/318,600 filed Mar. 29, 2010, and entitled "Switching Regulator," which is incorporated herein by reference as if set forth in its entirety.

TECHNICAL FIELD

The present invention relates generally to the conversion of high voltage alternating current (AC) to low voltage direct current (DC), and more particularly to devices and methods for converting high voltage AC to low voltage high current DC without using high voltage filter capacitors and high voltage switching transformers.

BACKGROUND

Many applications, such as computer power supply and power supplies in TV and Video sets, require low voltage DC output power for use by analog and digital circuitry. However, the power available to them is the mains power which is high voltage AC, supplied by an AC electric power utility and usually within the range of 80 VAC and 600 VAC. As the mains power is the only power available for use with these types of applications the high voltage AC mains power requires to be converted to low voltage DC power before supplying to the components.

The available power supply systems, to provide the high voltage AC to low voltage DC conversion, can be broadly classified into four categories: the mains frequency transformer approach, the high voltage linear regulator approach, the high voltage capacitive coupling approach, and the switching power supply approach.

The transformer-based power supplies approach uses a step down mains frequency transformer and some type of wave rectification. These power supplies are isolated from the mains power supply but this isolation requires a bulky and expensive transformer. Further, size of other components, such as capacitors, that are used in conjunction also increases due to the low frequency of operation (50/100 Hz or 60/120 Hz).

The high voltage linear regulator approach eliminates the large, costly step down mains frequency transformer, but has the disadvantage of large capacitors (due to the low frequency of 50/100 Hz or 60/120 Hz) and high power dissipation requirements because the excess voltage has to be dropped across the linear pass element.

The high voltage capacitive coupling power supplies approach also eliminates the step down transformer and has better efficiency than the high voltage linear regulator approach but has poor regulation and requires large high voltage capacitive elements.

The available switching power supplies approach can be further classified into three classes. In the first class are the conventional switching power supplies that can step down high voltage AC from mains power supply to low voltage DC with a very small transformer because of the high switching frequency. These power supplies are also isolated from the mains but the transformer and switch element must be able to withstand the mains voltage and switching transients. Further, the filter capacitors at the input to these switching power supplies must be rated to withstand the maximum peak line voltage and are required to have enough capacitance to maintain the voltage ripple within acceptable limits at the minimum line voltage. These two conditions result in physically large capacitors. These requirements increase the cost and size, though not to the level of the linear power supplies, and make it difficult to use in space-constrained applications, such as telemetry modules for smart electric utility meters, computers, and TV sets.

For example, FIG. 1 is a diagram of a conventional switching power supply used to convert the AC line voltage 110 and produce DC output voltage 170. The power supply includes a bridge rectifier 120 and a DC-DC converter 100. It will be understood by those skilled in the art that the filter capacitor 130, the switch 140, and the transformer 150 all must be rated to withstand the peak of the maximum input voltage 110 with an adequate margin of safety. For example, for 600 VAC input (480 VAC with 25% safety margin) the rating is 848.5V. Thus, the filter capacitor 130, the switch 140, and the transformer 150 must be capable of withstanding 848.5V plus any switching transients that may be generated.

In the second class are the switching power supplies that produce low voltage DC from high voltage AC supplied from mains power supply by using a switch that turns on when the input voltage is below the desired output voltage and turns off when this threshold is exceeded. These are now commercially available as single chip solutions with an external switch. FIG. 2 illustrates such a switching power supply which rectifies and regulates high voltage alternating current without the use of transformers, large capacitive coupling circuits, or high voltage linear regulators. The device includes a rectifier 220, a control circuit 230 for sensing the output voltage of the rectifier 220 and switching on and off the output of rectifier 220, a first storage capacitor 240, a low voltage linear regulator 250 and a second storage capacitor 260. The control circuit 230 effectively divides the device into a high voltage subsystem 200 and a low voltage subsystem 280. Although these devices provide advantages in terms of low cost and smaller size, the disadvantages are that they are not isolated from the mains power supply and the linear regulator drastically reduces the efficiency if there is any significant difference between the output voltage of the control circuit 230 and the final output voltage 270.

FIG. 3A through FIG. 3D illustrate a voltage waveform at different points in the circuit of FIG. 2. As shown in FIG. 3A, the voltage waveform 310 of the output of the rectifier 220 to the control circuit 230, is a rectified form of the input voltage 210 at the same magnitude as the input voltage 210. The typical output from control circuit 230 for such an input from the rectifier 220 would be the voltage waveform 320 as shown in FIG. 3B, in which the circuit is closed whenever the full wave rectified voltage is below a prescribed threshold voltage 300, for example 40 Volts. However, the waveform 330 in FIG. 3C shows how the output of the control circuit 230 is altered due to the presence of capacitor 240 in the circuit design of FIG. 2. The low voltage linear regulator 250 of FIG. 2 then produces the regulated DC output voltage waveform 340 as shown in FIG. 3D, though at a limited output power as noted above.

In the third class are the switching power supplies that are a combination of switching power supplies of first and second classes. These use the switching power supply of second class as a pre-regulator for the switching power supply of first class. This results in a power supply that is low cost and compact and is isolated from the high voltage AC mains power supply, but needs two separate switches. The first switch is a high voltage low frequency switch and it acts as a pre-regulator to a second low voltage high frequency switch that does the DC-DC conversion. The second switch may be part of an off the shelf "Brick" DC-DC converter.

Such a device is shown in FIG. 4, and includes a rectifier 420 for receiving a high voltage AC line power input and for outputting a full wave rectified, high voltage DC, a gating component 430 coupled to the rectifier 420 for receiving the high voltage full wave rectified DC output, acting as the high voltage low frequency switch and outputting an intermediate voltage DC capped by a preset voltage threshold, a first capacitor 440 to smooth out AC ripples, a DC-DC converter 450 coupled to the gating component 430, for receiving the intermediate voltage DC output, through the first output capacitor 440, wherein the DC-DC converter 450 is configured to step down the intermediate voltage DC to a desired high current, low voltage DC output using the second low voltage high frequency switch 460 integrated into the DC-DC converter 450 and a second capacitor 470 coupled to the output of the DC-DC converter 450 to further smooth out the high current, low voltage DC output.

FIG. 5A through FIG. 5D illustrate a voltage waveform at different points in the circuit of FIG. 4. As shown in FIG. 5A, the bridge rectifier 420 rectifies the AC input voltage 410, which may range from 80 to 600 VAC, and provides the full wave rectified DC waveform 510. Now, the gating component 430 turns on at zero crossing and turns off when the full wave rectified DC voltage exceeds a preset voltage threshold $V_T$ (shown as threshold 500 in FIG. 5A through 5D), allowing an intermediate DC voltage. Next, the capacitor 440 reduces the AC ripples from the intermediate DC voltage and provides a pre-regulated intermediate DC voltage 530 to the DC-DC converter 450, including switch 460 and the transformer, as shown in FIG. 4. These components step down the pre-regulated intermediate voltage DC 530, with another capacitor 470 to further reduce the AC ripples, to a predetermined final DC voltage 540, as shown by curve 540 in FIG. 5D.

The third type of switching power supply is an improvement over the second type because it replaces the linear regulator 250 of FIG. 2 with a DC-DC converter 450 in FIG. 4, and thus improves the current output capability and efficiency. The need for two separate switching elements (high voltage, low frequency switch used for gating and low voltage high frequency switch used for DC-DC conversion) is a disadvantage because it adds cost and complexity.

There is therefore a need for improved systems, devices, and circuit designs for converting high voltage AC to low voltage DC without the use of large high voltage filter capacitors or large high voltage switching power supplies or multiple switches, while also providing for high current low voltage DC outputs. Further, there is a need to provide methods, systems, circuit designs, and devices to reduce the size and cost of a power supply module.

BRIEF SUMMARY OF THE INVENTION

The present invention provides a solution to the above mentioned problems by improving upon the advantages of the switching power supplies of third class, by using a single switch to perform both the functions of pre-regulation and switching conversion and eliminating the need for bulky, high voltage input capacitor. Further, the DC-DC converter of the present invention regulates its output voltage by changing the input voltage threshold below which it starts switching, instead of using pulse width modulation (PWM) or other known regulation technique.

Briefly described, aspects of the present invention relate to apparatus and methods for conversion of high voltage AC to low voltage high current DC without using high voltage capacitors or high voltage DC-DC transformers. A single electronically actuated switch is used to perform both the functions of pre-regulation and switching conversion by switching a rectified input power voltage to a transformer and filter capacitor only during such times as the input power voltage is below a predetermined voltage limit and the output power voltage is below a required output DC voltage level. An input voltage detector determines when the input power AC is below a predetermined voltage limit. A threshold voltage generator provides a threshold voltage corresponding to the DC output voltage. A voltage comparator coupled to the input voltage detector and threshold voltage generator enable a pulse generator to activate the switch to gate a number of pulses of the input power, while below the predetermined voltage limit, at predetermined frequency to a transformer. The converter regulates its output voltage by changing the input voltage threshold below which it starts switching, instead of using PWM or other known regulation technique.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
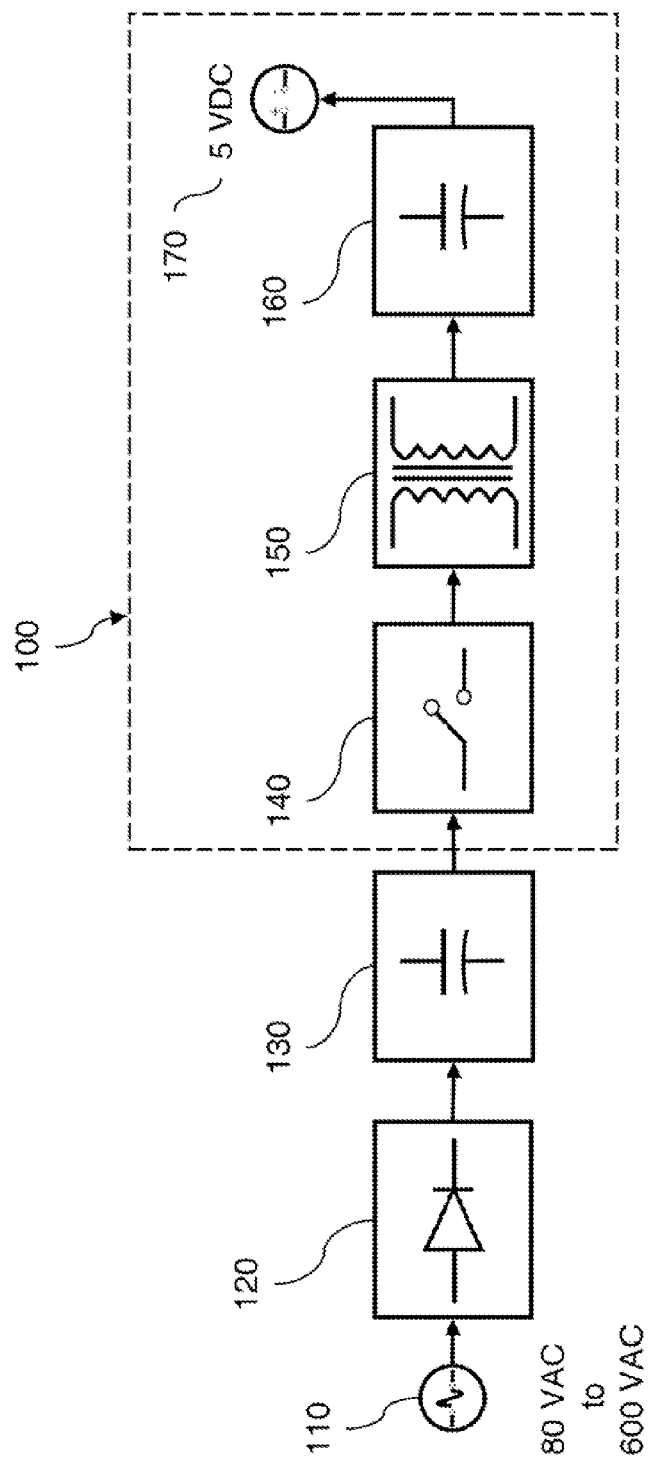
FIG. 1 is a schematic of a prior art conventional switching power supply.
Figure 2:
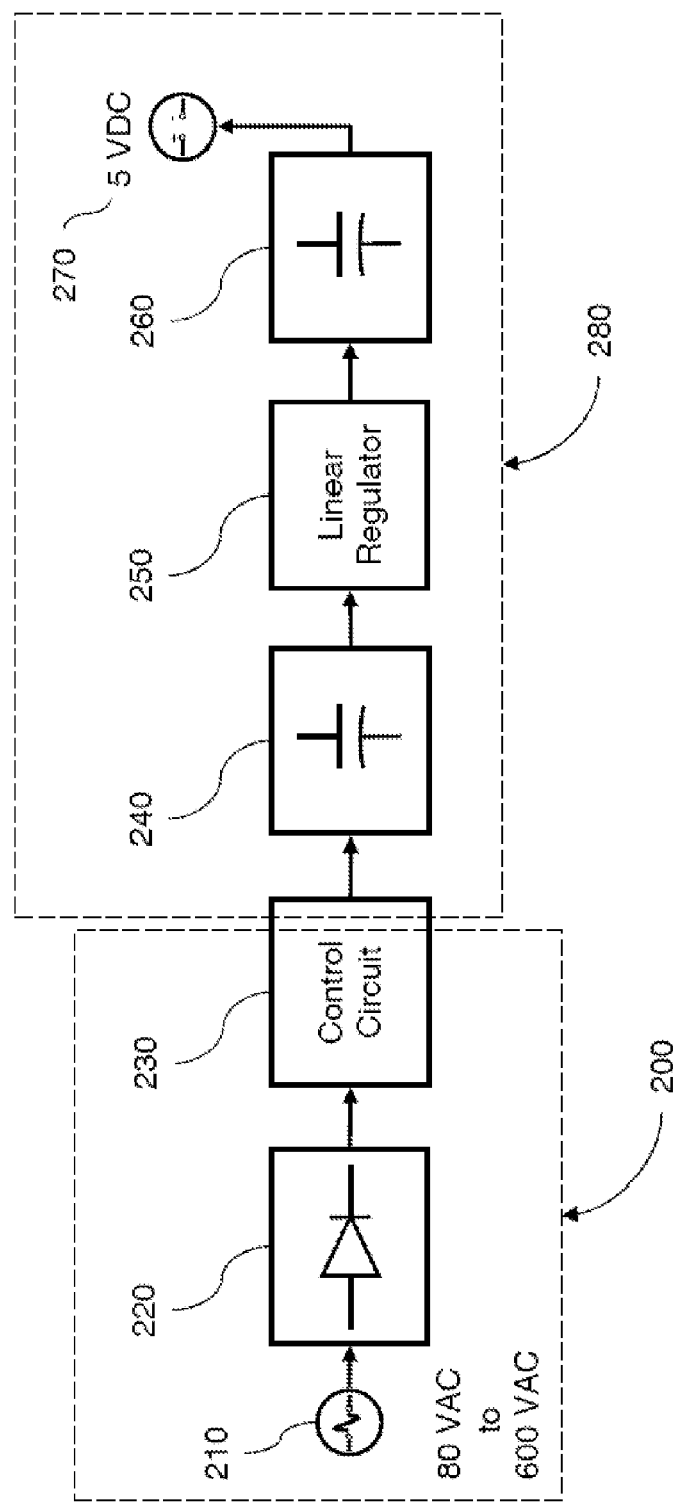
FIG. 2 is a schematic of a prior art switching power supply that produces low voltage DC from high voltage AC supplied from mains power supply by using a switch that turns on when the input voltage is below the desired output voltage and turns off when this threshold is exceeded using a control circuit to divide high voltage and low voltage subsystems.
Figure 3B:
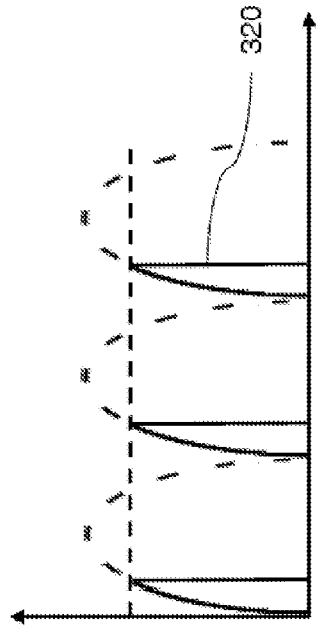
FIGS. 3A-3D illustrate the voltage waveforms corresponding to various locations on the schematic of the prior art switching power supply of FIG. 2.
Figure 3D:
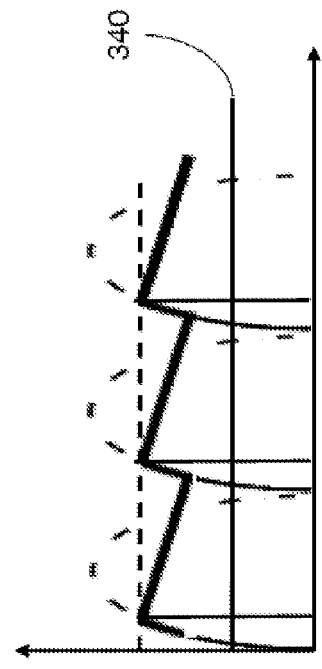
Figure 3A:
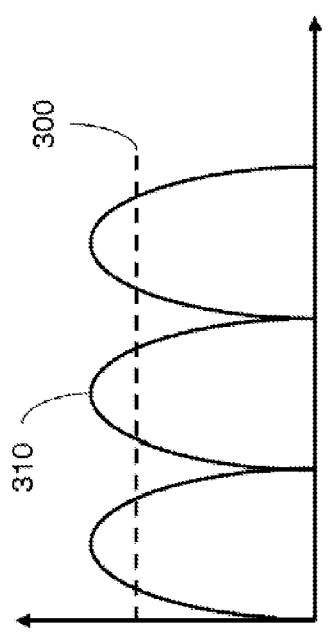
Figure 3C:
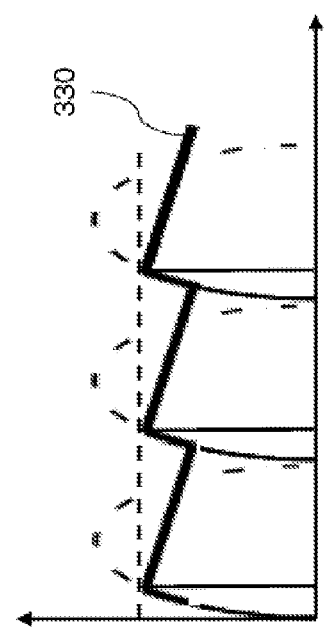

Reference is now made in detail to the description of the embodiments of systems and methods for conversion of high voltage alternating current (AC) to low voltage direct current (DC), as illustrated in the drawings. The invention may, however, be embodied in many different forms and should not be construed as limited to the embodiments set forth herein; rather, these embodiments are intended to convey the scope of the inventions to those skilled in the art. Furthermore, all "examples" given herein are intended to be non-limiting.

Various embodiments are described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

Figure 7:
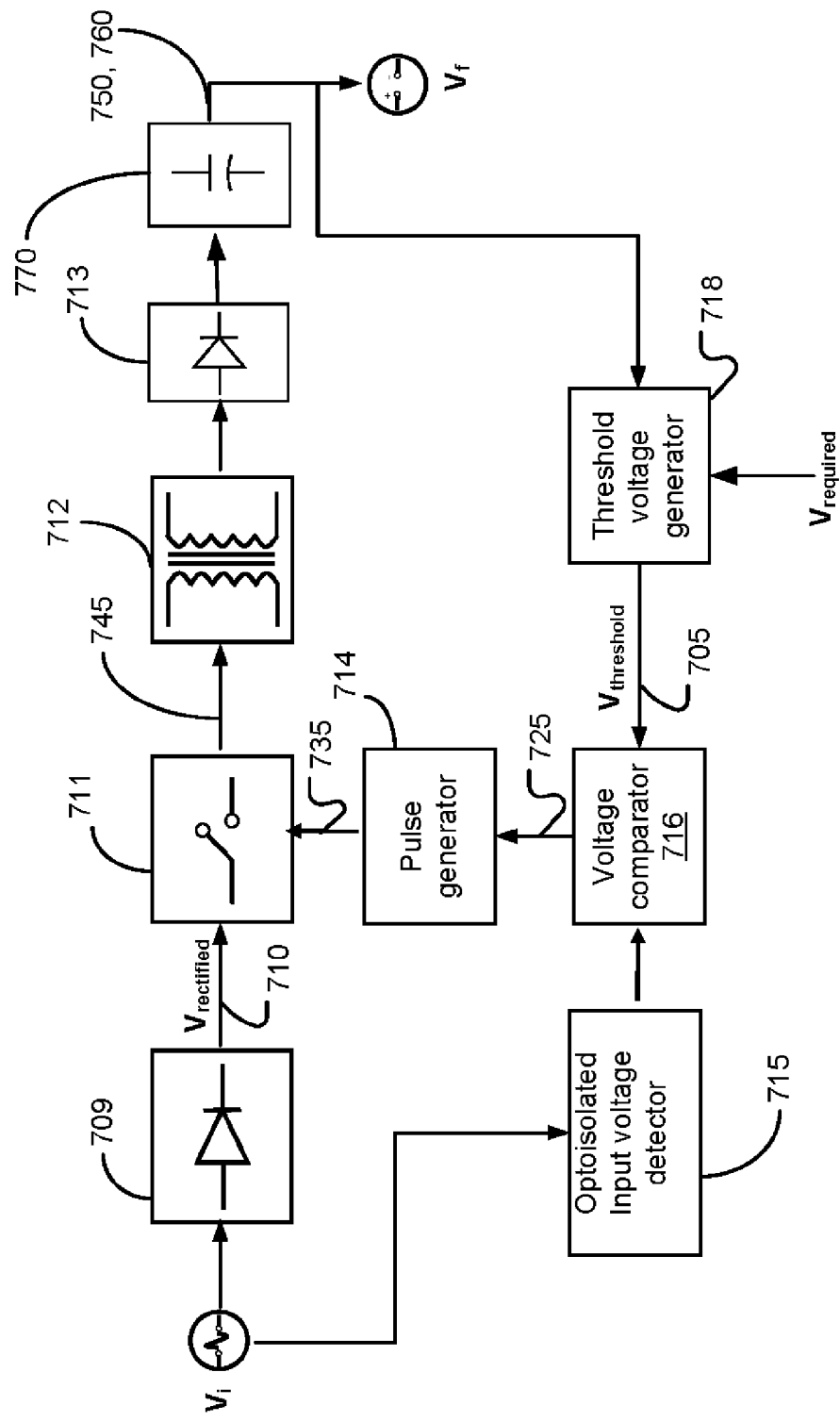
FIG. 7 illustrates an embodiment of a preferred power supply module constructed in accordance with aspects of the present invention.
Figure 8:
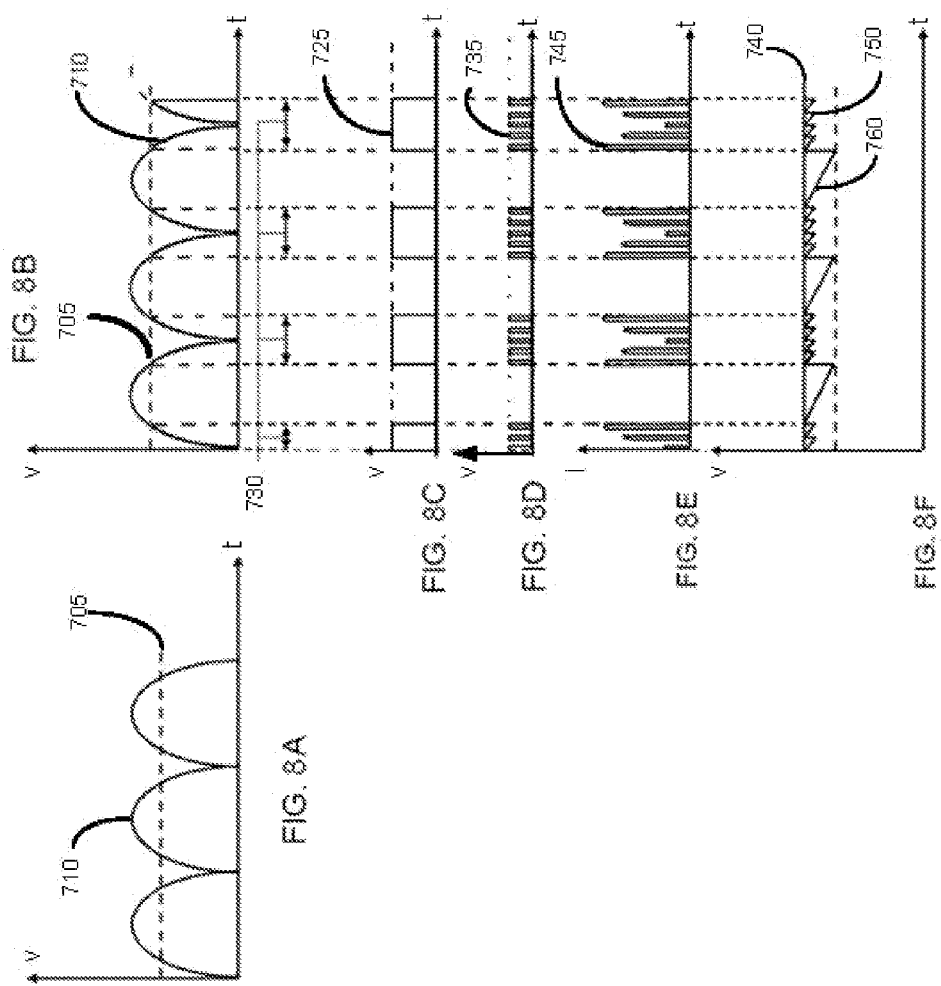
FIGS. 8A-8F illustrate voltage waveforms corresponding to various locations on the schematic of the preferred power supply module of FIG. 7.

Referring to FIGS. 7 and 8, FIG. 7 is a schematic illustrating a preferred embodiment of a switching power supply module 700 for converting high voltage alternating current (AC) $V_i$ to low voltage direct current (DC) $V_f$ without the need for large high voltage filtering capacitors or high voltage switching power supplies or two separate switches. FIG. 8A through FIG. 8F illustrate a voltage waveform at different points in the switching power supply module 700, as will be described in greater detail herein.

As shown in FIG. 7, a bridge rectifier 709 rectifies the AC input $V_i$, which may range from 80 to 600 VAC, and provides a full wave rectified DC waveform 710 as input to the high voltage switch 711. In one embodiment, the switch 711 is a Emitter Switched Bipolar Transistor or ESBT manufactured by ST Microelectronics. In an embodiment, the switch 711 starts switching as soon as the input voltage 710 falls below a preset voltage threshold $V_{threshold}$ (shown as threshold 705 in FIG. 8). Waveform 710 shows the voltage waveform present at the input of the switch 711 when it is switching during the periods indicated by 730 in FIG. 8B.

A pulse generator 714 provides a gating signal on line 735 to the switch 711 at a predetermined frequency, greater than the frequency of the AC input power. Preferably, the frequency of the gating signal, and thus of the output of the switch 711, is between about 20 kHz and about 100 kHz. In one embodiment, the pulse generator is a TS555IDT low power CMOS timer manufactured by ST Microelectronics.

FIG. 8B also shows the periods 730 during which the switch 711 keeps switching, that is, during the time that the input voltage $V_{rectified}$ 710 remains below $V_{threshold}$ 705. The waveform 725 of FIG. 8C shows the output of the voltage comparator 716 which is high whenever the rectified input voltage 710 is below the threshold voltage 705. The waveform 735 of FIG. 8D shows the output of the pulse generator 714. The pulse generator 714 generates a train of pulses as long as the output of the voltage comparator 716 remains high and does not generate any pulses when the output of the voltage comparator 716 is low. In one embodiment, the comparator 716 is a TLV3401IDBVR voltage comparator manufactured by Texas Instruments.

A threshold voltage generator 718 receives the output voltage $V_f$ and compares this voltage to a predetermined reference voltage $V_{required}$, which corresponds to the desired DC output voltage level. In one embodiment, the threshold voltage generator is a CA3140 operational amplifier manufactured by Intersil coupled to $V_f$ by a 4N35SR2M optocoupler manufactured by Fairchild Semiconductors and also coupled to a zener-based voltage reference that provides the reference voltage $V_{required}$.

The waveform 745 of FIG. 8E shows the amplitude variations of the current pulses delivered by switch 711 to the transformer 712. It can be seen that the amplitude of the current pulses is proportional to the instantaneous value of the voltage waveform 710. This fact is used to regulate the output voltage $V_f$ as follows:

If $V_f$ falls below the required value $V_{required}$, the threshold voltage generator 718 increases the threshold voltage 705. This increases the peak value of the current pulses delivered into the primary winding of the transformer 712.

The energy transferred to the secondary winding by each pulse in discontinuous conduction mode is given by E=½ LI² - - - (Equation 1), where E is the energy in Joules, L is the inductance of the primary winding in Henrys and I is the peak value of the primary current in amperes.

The peak primary current I during a pulse in discontinuous mode is given by I=(V×t)/L - - - (Equation 2), where V is the input voltage in volts during the pulse, t is the duration of the pulse in seconds and L is the inductance of the primary in Henrys $$\text{Combining equations (1) and (2) we get } E=V^2t^2/2L \qquad \text{(Equation 3)}$$

If less energy is transferred to the secondary with each pulse than is taken away by load connected across capacitor 770, voltage $V_f$ falls. Since the energy transferred to the secondary with each pulse is a function of the input voltage during that pulse as shown by equation (3), the Threshold voltage generator 718 samples the output voltage $V_f$ and keeps increasing the threshold voltage till $V_f$ reaches $V_{required}$.

If $V_f$ rises above the required value $V_{required}$, the threshold voltage generator 718 decreases the threshold voltage 705. This decreases the peak value of the current pulses delivered into the primary winding of the transformer 712.

Since less energy is transferred to the secondary with each cycle (as given by Equation (3)), the voltage $V_f$ falls. The Threshold voltage generator samples the output voltage $V_f$ and keeps decreasing the threshold voltage till $V_f$ reaches $V_{required}$.

It is important to keep in mind that this control scheme does not require any modulation of the on time or off time of the pulses, although this may be done to provide an additional level of control.

The input voltage detector 715 provides a sample of the input AC voltage to the voltage comparator 716 to be compared against the threshold voltage 705.

Still referring to FIG. 7, according to another aspect of the invention, a rectifier 713 is coupled between the secondary of the transformer 712 and the capacitor 770 to provide further rectification of the output voltage from the transformer 712.

Further, FIG. 8F shows the final (No load) rectified DC voltage output 740 from the rectifier 713 that is connected to the secondary of transformer 712, followed by the capacitor 770 to smooth out the output 740.

As can be seen, the output waveform under load shows small high frequency (equal to the switching frequency of the switch 711) ripples 750 superimposed on a larger low frequency ripple 760. The high frequency ripple 750 is caused by the switching frequency of the switch 711, while the low frequency ripple 760 is caused by the off-time (when input voltage is above the threshold and switching is stopped) alternating with the on-time (when the input voltage is below the threshold and the switch 711 is switching).

As a result of the above, the transformer 712 and the capacitor 770 never see the full input voltage 710 as long as $V_{threshold}$ is kept lower than $V_i$. Since voltage for these components is limited, the large (and bulky) high voltage transformers and capacitors that require large portions of printed circuit board (PCB) space are not required in implementations according to the preferred embodiments of the present invention. In an embodiment of the invention for operation with conventional (household and industrial) 120 VAC input power, the voltage rating for the transformer 712 can be as low as 72 volts, and the voltage rating for the capacitor 770 can be as low as 72 volts. It will be appreciated that such low voltage ratings for these components allow an AC-DC power converter constructed as described herein to be compact and low cost due to the ability to employ low voltage rated components.

It will also be appreciated that the circuit as described herein has a failure mode that prevents high input voltage from damaging the low voltage rated components. As will be understood, the pulse generator only activates the switch 711 with its pulses so long as the input voltage is below the threshold voltage as determined by the threshold voltage generator. If the input voltage suffers a temporary high voltage spike or overvoltage condition, no pulses will be generated by the pulse generator 714 and thereby prevent high voltage from being coupled to the transformer 712 or filter capacitor 770.

Figure 9:
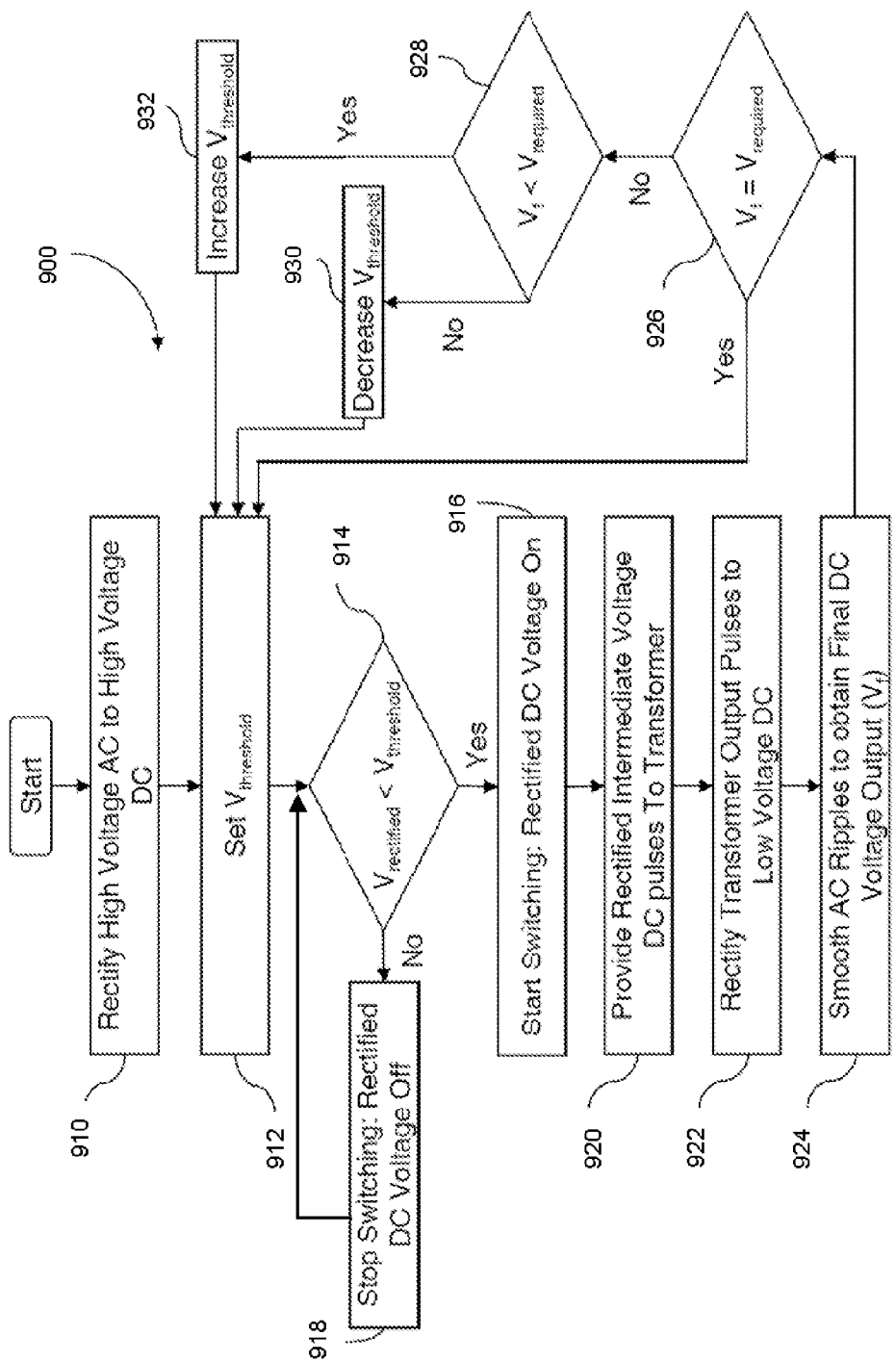
FIG. 9 is a flow chart illustrating the steps of a method taken to reduce high voltage low current AC to low voltage high current DC using a module in accordance with that shown in FIG. 7.

FIG. 9 is a flow chart illustrating the steps of a method or process 900 taken to reduce high voltage low current AC to low voltage high current DC as described before using the module and waveform shown in FIGS. 7 and 8, respectively. At step 910, high voltage AC is obtained from the mains power supply $V_i$ and is rectified to a high voltage DC. At step 912, a preset threshold voltage $V_{threshold}$ is determined, such that the switch 711 stops switching when the rectified voltage is above $V_{threshold}$. At step 914, a determination is made that whether the rectified voltage $V_{rectified}$ is above $V_{threshold}$ or below $V_{threshold}$. If $V_{rectified}$ is below $V_{threshold}$ the process moves to step 916 and the switch 711 keeps switching. However, if $V_{rectified}$ is above $V_{threshold}$ then step 918 is executed and the switch 711 stops switching.

On determination that $V_{rectified}$ is below $V_{threshold}$, at step 920 the rectified DC pulses are provided to the transformer 712. At step 922 the transformer output pulses are rectified by rectifier 713 to a final low voltage DC. Next, at step 924 AC ripples are smoothed out using the capacitor 770 to produce the final low voltage smooth DC output which is provided to the required components.

To control irregularities in the required output voltage due to fluctuations in input voltage, most of the available switching power supplies use a form of output voltage regulation known as Pulse Width Modulation (PWM) to ensure a steady supply to the components. As per PWM, a feedback loop is used to correct the output voltage by changing the on-time or off time of the switching element in the converter. In an embodiment of the present invention, a voltage regulation method has been used, as shown in the FIG. 9. As per this, the threshold voltage generator 718 receives the final smoothed out output voltage as a feedback and adjusts the threshold voltage $V_{threshold}$. Thus, $V_{threshold}$ is pushed up to a higher voltage if the output voltage falls below the desired value and $V_{threshold}$ is pulled down to a lower voltage is the output voltage rises above the desired value. This is shown in steps 926 to 932 in the flowchart of FIG. 9.

Figure 4:
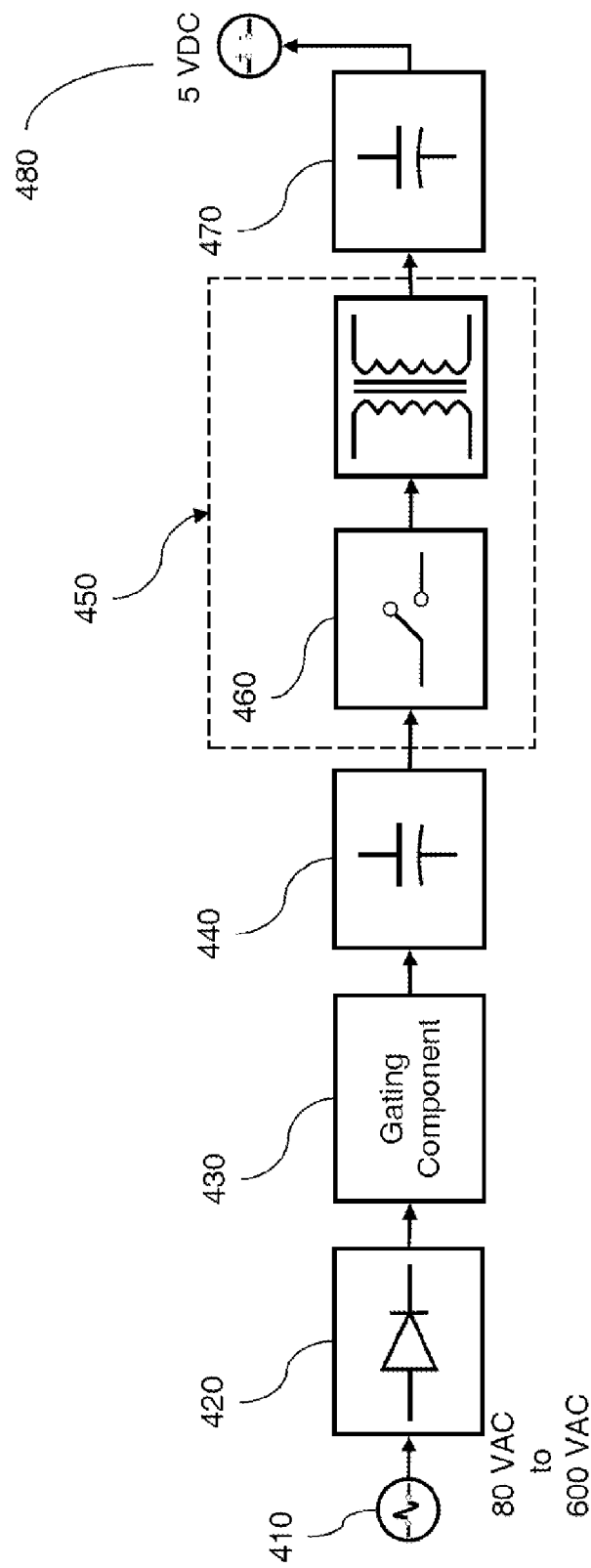
FIG. 4 is a schematic of a prior art switching power supply, using a DC-DC converter and one additional switch.
Figure 5A:
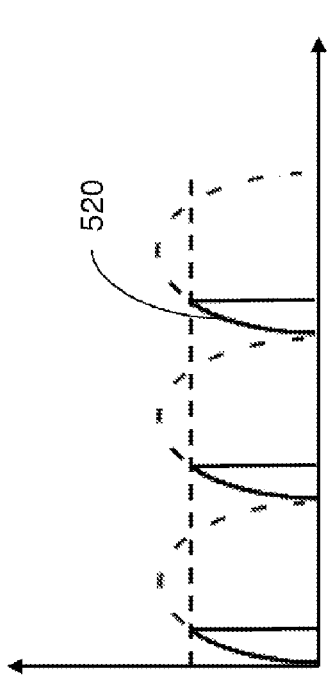
FIGS. 5A-5D illustrate the voltage waveforms corresponding to various locations on the schematic of the prior art switching power supply of FIG. 4.
Figure 5B:
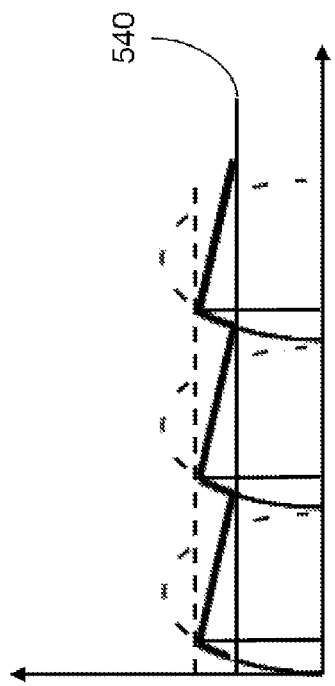
Figure 5C:
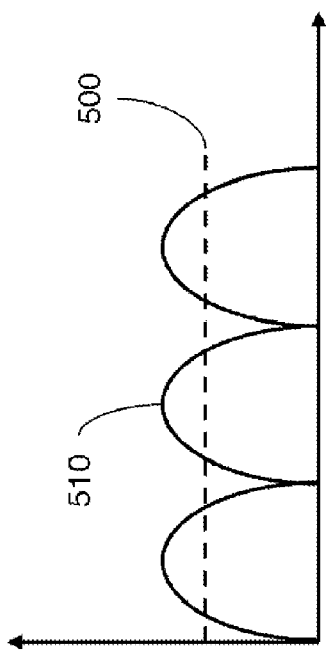
Figure 5D:
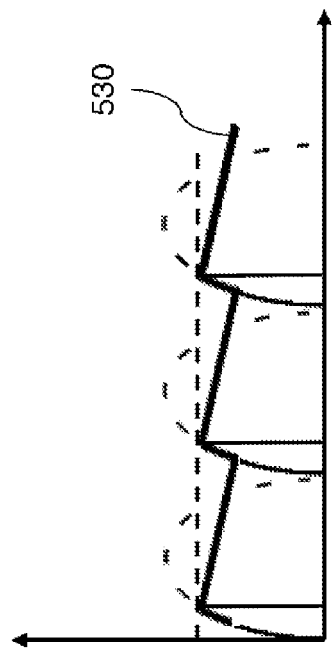
Figure 6:
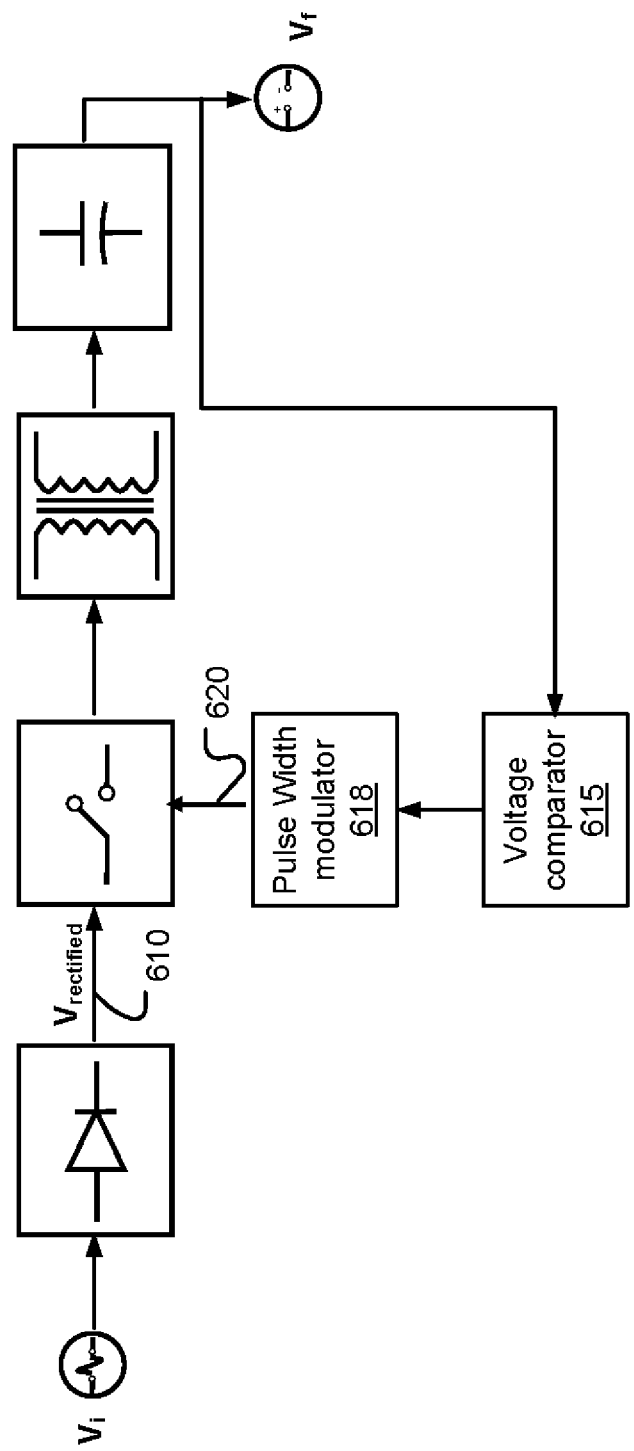
FIG. 6 is a schematic of a prior art circuit that shows the control scheme of the power supply module of FIG. 1, having a pulse width modulator (PWM) for implementing various forms of pulse modulation including off-time modulation, on-time modulation or any combination thereof.

As one with skill in the art will appreciate from a closer study of FIG. 4, in order to use a standard "off the shelf" DC-DC converter with maximum input voltage capability of a particular voltage, one must set the gating component 430 to "cut-off" at that voltage, i.e. the $V_{threshold}$. One skilled in the art will further appreciate that the present invention benefits from retaining the feature of the schematic of FIG. 4 that the transformer 712 and capacitor 770 need not be rated to withstand the full input voltage $V_i$ because they are never exposed to the full input voltage $V_i$ as long as the threshold voltage 705 remains lower than $V_i$.

Further, as can be seen from FIG. 4, the prior art DC-DC converter 450 keeps running at all times drawing on energy stored in the input capacitor 440. The gated power supply recharges this capacitor 450 when the input rectified DC is below a preset voltage threshold. Advantageously, as per the present invention, the transformer 712 and switch 711 of the power supply module 700 runs only when the full wave rectified DC is below the voltage threshold $V_{threshold}$ and no input capacitor is required.

Additionally, the switching transformer 712 and the downstream components (770, etc.) never see the full input voltage from the mains power supply $V_i$, and hence are not required to be rated to withstand the full input voltage. These need only be rated to sustain the voltage below the threshold voltage $V_{threshold}$. There is no need for rating these components according to the line power $V_i$ supplied by the AC power utility, since the high voltages do not propagate beyond the switch 711. As a result, the switching transformer 712 and the downstream components can be much smaller and more cost effective than a conventional switching power supply.

Figure 10:
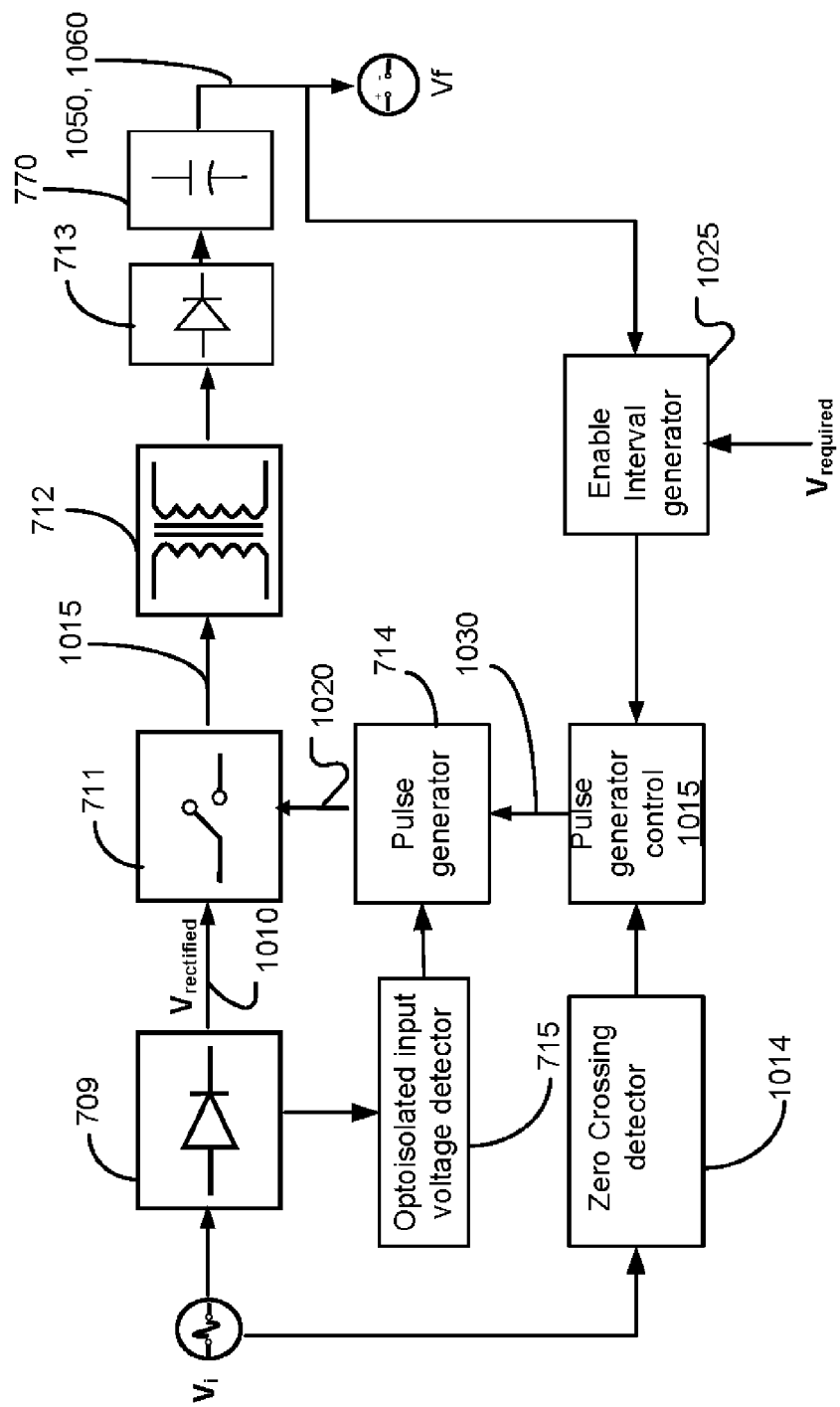
FIG. 10 illustrates an alternate embodiment of the preferred power supply module according to another aspect of the invention.
Figure 12:
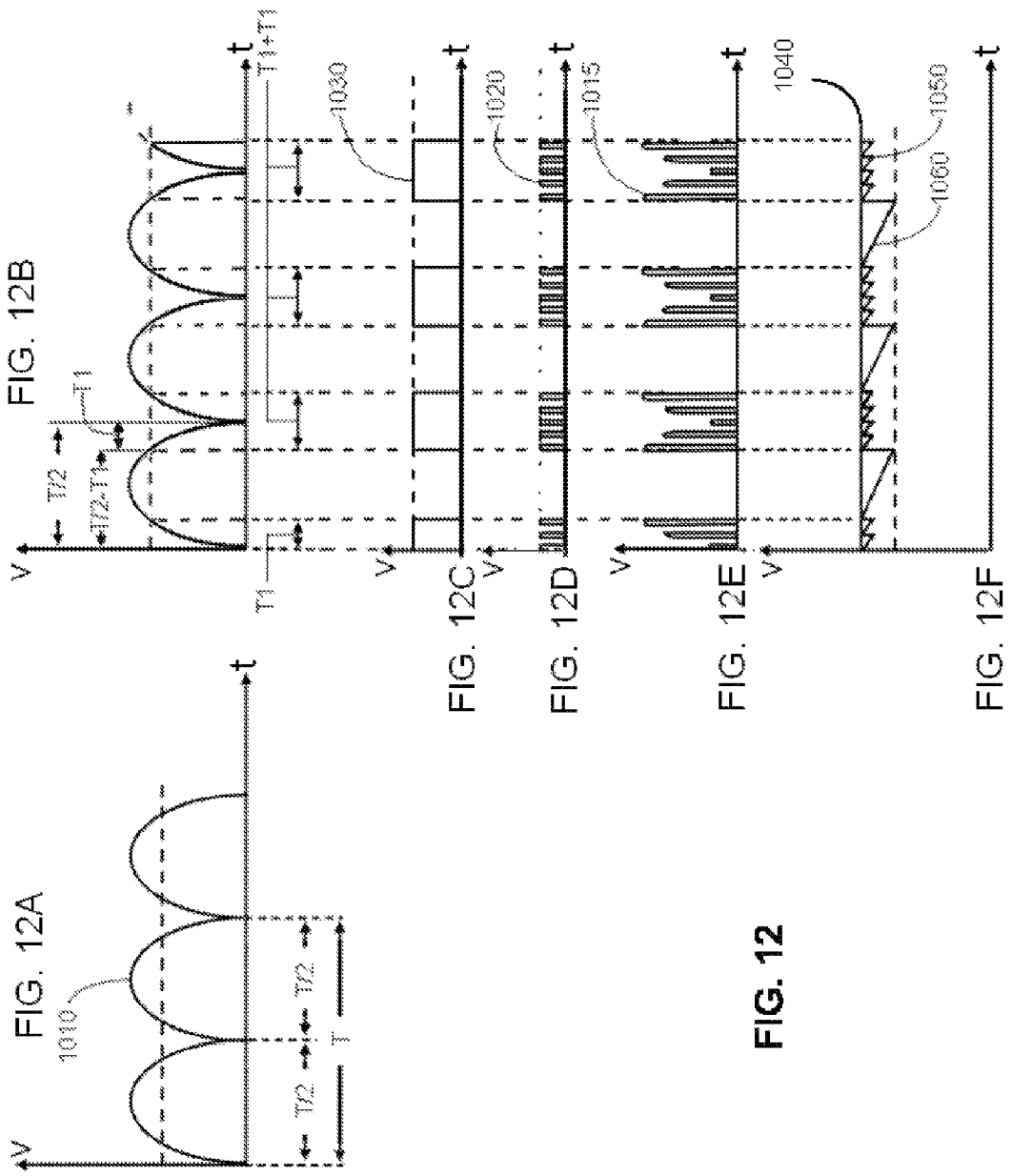
FIGS. 12A to 12F illustrate the voltage waveforms corresponding to various locations on the schematic of FIG. 10.

Referring to FIGS. 10 and 12, FIG. 10 is a schematic illustrating an alternate embodiment of a switching power supply module 1000 for converting high voltage alternating current (AC) to low voltage direct current (DC) without the need for large high voltage filtering capacitors or high voltage switching power supplies or two separate switches. FIG. 12A through FIG. 12F illustrate a voltage waveform at different points in the switching power supply module 1000, as will be described in greater detail herein.

As shown in FIG. 10, a bridge rectifier 709 rectifies the AC input $V_i$, which may range from 80 to 600 VAC, and provides a full wave rectified DC waveform 1010 as input to the high voltage switch 711. In an embodiment, the switch 711 starts switching as soon as a zero crossing is detected by a zero crossing detector 1014. The switch 711 stops switching as soon as the enable interval $T_1$ generated by an Enable interval generator 1025 ends. The waveform of FIG. 12A shows the time period T of the full wave rectified waveform 1010. The waveform of FIG. 12B shows the relationship between the time period T and the enable interval $T_1$ denoted by 1030 in FIG. 12C The zero crossing detector 1014 triggers the pulse generator control 1015 every time a zero crossing in the input AC waveform $V_i$ is detected. Once triggered, the pulse generator control output 1030 (as shown in FIG. 12C) remains high for the duration of the Enable interval. As long as the output of the pulse generator control 1030 is high, the pulse generator 714 keeps outputting pulses 1020 (as shown in FIG. 12D) that pulse the switch 711 on and off with each pulse. Each time the switch is pulsed on, a current pulse proportional to the instantaneous value of the rectified AC voltage 1010 is injected into the primary winding of the transformer 712. The low voltage output pulse at the output of the secondary winding of the transformer 712 is rectified by the rectifier 713 and filtered by the filter capacitor 770 to produce the final output 1040 as shown in FIG. 12F. The pulse generator is disabled if an overvoltage condition is detected by the optoisolated input voltage detector 715.

The waveform 1015 of FIG. 12E shows the amplitude variations of the current pulses delivered by switch 711 to the transformer 712. It can be seen that the amplitude of the current pulses is proportional to the instantaneous value of the voltage waveform 1010. This fact is used to regulate the output voltage $V_f$ as follows:

If $V_f$ falls below the required value $V_{required}$, the enable interval generator 1025 increases the length of the enable interval 1030. This increases the effective input voltage when pulses are being delivered into the primary winding of the transformer 712.

The energy transferred to the secondary winding by each pulse in discontinuous conduction mode is given by $E=\frac{1}{2}V^2t^2/L$ - - - (Equation (3)), where E is the energy in Joules, L is the inductance of the primary winding in Henrys, t is the duration of the pulse in seconds and V is the input voltage in volts during the pulse.

Since more energy is transferred to the secondary with each cycle, the voltage $V_f$ rises. The Threshold voltage generator samples the output voltage $V_f$ and keeps increasing the threshold voltage till $V_f$ reaches $V_{required}$.

If $V_f$ rises above the required value $V_{required}$, the enable interval generator 1025 decreases the length of the enable interval 1030. This decreases the effective input voltage when current pulses are being delivered into the primary winding of the transformer 712.

Since less energy is transferred to the secondary with each cycle (as given by (3)), the voltage $V_f$ falls. The enable interval generator 1025 samples the output voltage $V_f$ and keeps decreasing the enable interval till $V_f$ reaches $V_{required}$.

It is important to keep in mind that this control scheme does not require any modulation of the on time or off time of the pulses although this may be done to provide an additional level of control.

Further, FIG. 12F shows the final (No load) rectified DC voltage output 1040 from the rectifier 713 that is connected to the secondary of transformer 712, followed by the capacitor 770 to smooth out the output 740.

As can be seen, the output waveform under load shows small high frequency (equal to the switching frequency of the switch 711) ripples 1050 superimposed on a larger low frequency ripple 1060. The high frequency ripple 1050 is caused by the switching frequency of the switch 711, while the low frequency ripple 1060 is caused by the off-time (when 1030, the output of the pulse generator control 1015 is low and switching is stopped) alternating with the on-time (when 1030, the output of the pulse generator control 1030 is high and the switch 711 is switching).

As a result of the above, the transformer 712 and the capacitor 770 never see the full input voltage 710 as long as the enable time $T_1$ is kept less than T/4 where T is the time period of the AC input waveform. Since voltage for these components is limited, the large (and bulky) high voltage transformers and capacitors that require large portions of printed circuit board (PCB) space are not required in implementations according to the preferred embodiments of the present invention.

Figure 11:
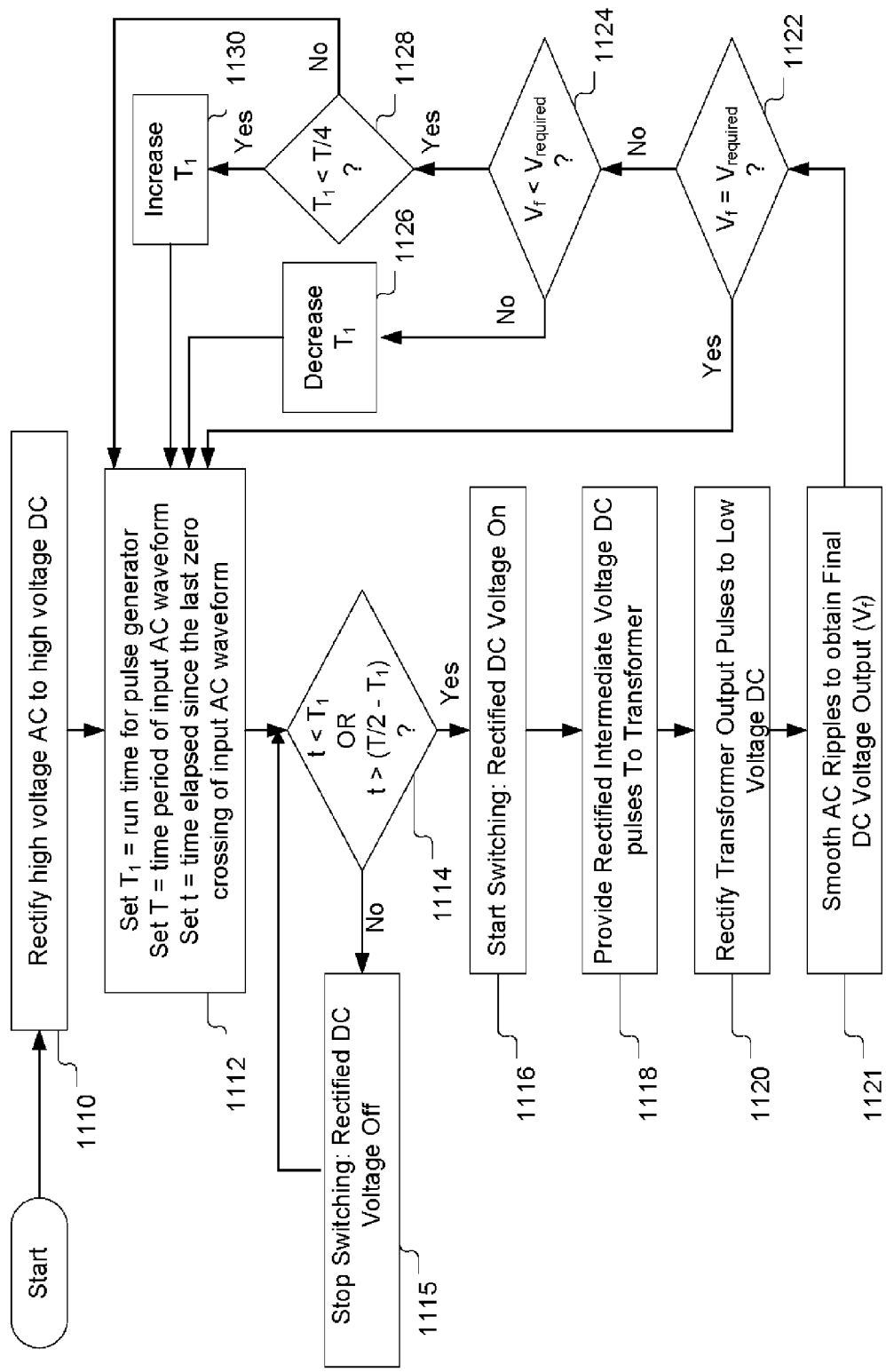
FIG. 11 is a flow chart illustrating steps of a method taken to reduce high voltage low current AC to low voltage high current DC using a module similar to that shown in FIG. 10.

FIG. 11 is a flow chart illustrating the steps 1100 taken to reduce high voltage low current AC to low voltage high current DC as described before using the module and waveform shown in FIGS. 10 and 12, respectively. At step 1010 high voltage AC is obtained from the mains power supply $V_i$ and is rectified to a high voltage DC. At step 1012, a preset enable time $T_1$ is determined, such that the switch 711 stops switching when the time elapsed since the last zero crossing exceeds $T_1$. At step 1114, a determination is made that whether the time elapsed since the last zero crossing is greater than or less than the enable interval $T_1$. If $t<T_1$ or $t>(T/2-T_1)$ the process moves to step 1116 and the switch 711 keeps switching. However, if this condition is found to be false, then step 1115 is executed and the switch 711 stops switching.

On determination that $t<T_1$ or $t>(T/2-T_1)$, at step 1118 the rectified DC pulses are provided to the transformer 712. At step 1120 the transformer output pulses are rectified by rectifier 713 to a final low voltage DC. Next, at step 1121 AC ripples are smoothed out using the capacitor 770 to produce the final low voltage smooth DC output which is provided to the required components.

To control irregularities in the required output voltage due to fluctuations in input voltage, most of the available switching power supplies use a form of output voltage regulation known as Pulse Width Modulation (PWM) to ensure a steady supply to the components. As per PWM, a feedback loop is used to correct the output voltage by changing the on-time or off time of the switching element in the converter. In this alternate embodiment of the present invention, a voltage regulation method has been used, as shown in the FIG. 11. As per this, the enable interval generator 1025 receives the final smoothed out output voltage as a feedback and adjusts the length of the enable interval. Thus, the enable interval is increased (thus increasing the voltage of the voltage pulses) if the output voltage falls below the desired value and decreased (thus decreasing the voltage of the voltage pulses) if the output voltage rises above the desired value. This is shown in steps 1122 to 1130 in the flowchart of FIG. 11.

As one with skill in the art will appreciate from a closer study of FIG. 4, in order to use a standard "off the shelf" DC-DC converter with maximum input voltage capability of a particular voltage, one must set the gating component 430 to "cut-off" at that voltage, i.e. the $V_{threshold}$. One skilled in the art will further appreciate that the present invention benefits from retaining the feature of the schematic of FIG. 4 that the transformer 712 and capacitor 770 need not be rated to withstand the full input voltage $V_i$ because they are never exposed to the full input voltage $V_i$ as long as the enable interval 1030 remains shorter than T/4 (one quarter of the time period of the input AC waveform).

There is no need for rating these components according to the line power $V_i$ supplied by the AC power utility, since the high voltages do not propagate beyond the switch 711. As a result, the switching transformer 712 and the downstream components can be much smaller and more cost effective than a conventional switching power supply.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope.

What is claimed is:

1. An apparatus for converting high voltage alternating current (AC) power input to a low voltage direct current (DC) power output, comprising:

a first rectifier to receive a high voltage AC line power input and to output a full wave rectified waveform;

an electronically actuated switch coupled to receive the full wave rectified waveform and provide a voltage-modulated pulse output in response to a gating signal;

an input voltage detector to provide an input voltage signal corresponding to a voltage of the AC power input;

a threshold voltage generator connected to receive the low voltage DC power output and provide a threshold voltage signal that varies in proportion to the low voltage DC power output;

a voltage comparator to compare the input voltage signal to the threshold voltage signal and to provide a control signal when the input voltage signal is below the threshold voltage;

a pulse generator to generate the gating signal at a predetermined frequency in response to the control signal;

a transformer having a primary coil coupled to the switch to receive the voltage-modulated pulse output and a secondary coil coupled with a second rectifier that provides the DC power output; and a filter capacitor to smooth the DC power output, whereby the apparatus is to provide the low voltage DC power output using the transformer, and the filter capacitor has voltage ratings less than a voltage peak of the AC power input by only gating power though the switch to the transformer and the filter capacitor when the AC power input voltage is below a predetermined value.

2. The apparatus of claim 1, wherein an amplitude of the voltage-modulated pulse output provided to the primary coil of the transformer corresponds to an instantaneous value of the high voltage AC line power input.

3. The apparatus of claim 1, wherein the second rectifier is coupled between the transformer and the filter capacitor.

4. The apparatus of claim 1, wherein the predetermined frequency of the pulse generator is greater than an AC line frequency.

5. The apparatus of claim 4, wherein the predetermined frequency of the pulse generator is between about 20 kHz and about 100 kHz.

6. The apparatus of claim 1, wherein a voltage rating of the transformer is less than about 72 volts for use in connection with 120 VAC power.

7. The apparatus of claim 1, wherein the voltage rating of the filter capacitor is less than about 72 volts for use in connection with 120 VAC power.

8. The apparatus of claim 1, wherein the input voltage detector comprises an optocoupler.

9. The apparatus of claim 1, wherein the threshold voltage generator comprises an operational amplifier, an optocoupler, and a zener based voltage reference for determining the threshold voltage signal.

10. The apparatus of claim 1, wherein the threshold voltage generator is to sample the DC power output voltage and increase or decrease the threshold voltage signal until the voltage of the DC power output is substantially equal to that of a reference voltage.

11. The apparatus of claim 1, wherein the transformer and the filter capacitor are isolated from the full input voltage so as long as the threshold voltage signal is kept lower than the voltage of the AC line power input.

12. A method for operating a circuit for converting high voltage alternating current (AC) power input to a low voltage direct current (DC) power output, comprising:

receiving a high voltage AC line power input;

rectifying the AC line power input to provide a full wave rectified waveform $V_{rectified}$;

determining a threshold voltage $V_{threshold}$ above which the full wave rectified waveform $V_{rectified}$ is to be isolated from a low voltage rated transformer having a primary coil and a secondary coil;

comparing the threshold voltage $V_{threshold}$ to a signal corresponding to an instantaneous voltage of the full wave rectified waveform $V_{rectified}$;

switching the full wave rectified waveform $V_{rectified}$ to the primary coil of the low voltage rated transformer at a predetermined frequency greater than that of a frequency of the AC power input, while the full wave rectified waveform $V_{rectified}$ is less than the threshold voltage $V_{threshold}$; and providing power from the secondary coil of the low voltage rated transformer as the low voltage DC power output, whereby the circuit provides the low voltage DC power output using the low voltage rated transformer having voltage ratings less than a voltage peak of the AC power input by only gating power though the switch to the transformer when the AC power input voltage is below a predetermined value.

13. The method of claim 12, wherein switching is effected by an electronically actuated switch coupled to receive the full wave rectified waveform and provide a voltage-modulated pulse output in response to a gating signal.

14. The method of claim 12, wherein an amplitude of the full wave rectified waveform $V_{rectified}$ provided to the primary coil of the transformer corresponds to an instantaneous value of the high voltage AC line power input.

15. The method of claim 12, further comprising obtaining a signal corresponding to the instantaneous voltage of the full wave rectified waveform $V_{rectified}$ from an input voltage detector that provides an input voltage signal corresponding to the voltage of the AC power input.

16. The method of claim 12, wherein determining the threshold voltage $V_{threshold}$ is effected by a threshold voltage generator connected to receive the low voltage DC power output and provide a threshold voltage signal that varies in proportion to the low voltage DC power output.

17. The method of claim 16, wherein the threshold voltage generator samples the low voltage DC power output and increases the threshold voltage $V_{threshold}$ until the low voltage DC power output reaches a predetermined reference voltage $V_{required}$.

18. The method of claim 12, wherein comparing the threshold voltage $V_{threshold}$ to a signal corresponding to the instantaneous voltage of the full wave rectified waveform $V_{rectified}$ is effected by a voltage comparator that provides a control signal when $V_{rectified}$ is below $V_{threshold}$.

19. The method of claim 12, wherein switching at a predetermined frequency is effected by an electronically actuated switch that is actuated by a pulse generator that generates a gating signal to the switch.

20. The method of claim 12, further comprising smoothing the low voltage rectified DC power output from the secondary coil of the low voltage rated transformer with a filter capacitor.

* * * * *